US010323571B2

(12) United States Patent
Subramanian et al.

(10) Patent No.: US 10,323,571 B2
(45) Date of Patent: Jun. 18, 2019

(54) METHOD AND SYSTEM FOR INLET GUIDE VANE HEATING

(71) Applicant: General Electric Company, Schenectady, NY (US)

(72) Inventors: Sesha Subramanian, Karnataka (IN); Bhaskar Nanda Mondal, Karnataka (IN); Sushilkumar Gulabrao Shevakari, Karnataka (IN); Mayank Krisna Amble, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 741 days.

(21) Appl. No.: 14/971,354

(22) Filed: Dec. 16, 2015

(65) Prior Publication Data

US 2017/0175628 A1 Jun. 22, 2017

(51) Int. Cl.
*F01D 25/02* (2006.01)
*F02C 7/047* (2006.01)

(52) U.S. Cl.
CPC .............. *F02C 7/047* (2013.01); *F01D 25/02* (2013.01)

(58) Field of Classification Search
CPC .......... F01D 25/02; F01D 9/065; F01D 5/187; F01D 5/186; F02C 7/047; F04D 29/584
See application file for complete search history.

(56) References Cited

U.S. PATENT DOCUMENTS

| | | | |
|---|---|---|---|
| 5,281,091 A | 1/1994 | Dooley et al. | |
| 5,911,679 A * | 6/1999 | Farrell | F01D 17/162 415/149.2 |
| 8,307,662 B2 * | 11/2012 | Turco | F01D 5/081 60/782 |
| 2007/0234704 A1 | 10/2007 | Moniz et al. | |
| 2012/0192544 A1 | 8/2012 | Roby et al. | |
| 2014/0169934 A1 | 6/2014 | DiBenedetto | |
| 2015/0345327 A1* | 12/2015 | Huang | F01D 9/065 415/115 |

* cited by examiner

*Primary Examiner* — Justin D Seabe
*Assistant Examiner* — Sabbir Hasan
(74) *Attorney, Agent, or Firm* — General Electric Company; Kristi Davidson

(57) ABSTRACT

A method of heating a hollow structure and a heating system are provided. The system includes a plurality of hollow structures spaced circumferentially about an annular flow path. The hollow structures include a heating fluid inlet port, a first plurality of film heating apertures, and a second plurality of film heating apertures. The hollow structures also include a first internal passage extending between the heating fluid inlet port and the first plurality of film heating apertures. The first internal passage includes an impingement leg configured to channel a first flow of heating fluid to a leading edge of the hollow structure. A second internal passage extends between the heating fluid inlet port and the second plurality of film heating apertures through a path along an inner surface of the hollow structure before being channeled to the second plurality of film heating apertures.

21 Claims, 7 Drawing Sheets

METHOD AND SYSTEM FOR INLET GUIDE VANE HEATING

BACKGROUND

The field of the disclosure relates generally to gas turbine engines and, more particularly, to a method and system for heating inlet guide vane systems in gas turbine engines.

At low altitude during cold ambient conditions gas turbine engines face issues like booster stall due to reduction in core flow as a result of blockage due to booster inlet guide vane (IGV) icing. At least some known gas turbine engines have used external heat pipes, heat exchangers, and bleed into the incoming air stream to facilitate booster IGV, splitter nose, nacelle lip and wing anti ice during low altitude operation. Additional heat exchangers or heat pipes on the engine adds weight, occupies valuable space and increases maintenance for the engine.

At high altitude gas turbine engines face issues such as, high pressure compressor (HPC) blade damage and combustor flame-out due to ice crystal icing (ICI), which can form on booster IGVs, booster vanes, booster OGVs, fan frame struts, HPC IGVs and internal surfaces of the booster case. During high altitude operation, the accumulated ice is shed off as big chunks and these may cause HPC rotor blade damage, potential thrust loss, engine stall, and/or engine shutdown. Additionally, the HPC blades have been ruggedized to be able to withstand a strike by accreted ice. Ruggedizing the HPC blades, results in a lesser HPC efficiency and a loss of performance.

BRIEF DESCRIPTION

In one aspect, a heating system includes a plurality of hollow structures spaced circumferentially about an annular flow path. At least one of the hollow structures includes a heating fluid inlet port, a first plurality of film heating apertures, and a second plurality of film heating apertures. The film heating apertures extend through a sidewall of the at least one hollow structure. The at least one hollow structure also includes a first internal passage extending between the heating fluid inlet port and the first plurality of film heating apertures. The first internal passage includes an impingement leg configured to channel a first flow of heating fluid to a leading edge of the hollow structure. A second internal passage extends between the heating fluid inlet port and the second plurality of film heating apertures through a tortuous path configured to channel a second flow of heating fluid along an inner surface of the hollow structure before being channeled to the second plurality of film heating apertures. The heating system includes a heating system header configured to receive the flow of heating fluid and distribute the flow of heating fluid to the at least one hollow structure. The heating system also includes a source of heating fluid.

In another aspect, a method of heating an airfoil member includes channeling a first flow of relatively hot fluid from one or more sources of the relatively hot fluid to a first internal passage of the airfoil member, the first internal passage extending between a heating fluid inlet port of the airfoil member and a first plurality of film heating apertures extending through a sidewall of the airfoil member. The method also includes channeling a second separate flow of relatively hot fluid from the one or more sources of the relatively hot fluid to a second internal passage of the airfoil member, the second internal passage extending between the heating fluid inlet port of the airfoil member and a second plurality of film heating apertures extending through the sidewall of the airfoil member, the second internal passage including a tortuous path configured to channel the second flow of relatively hot fluid along an inner surface of the airfoil member before being channeled to the second plurality of film heating apertures.

In yet another aspect, a turbofan engine includes a core engine including a multistage compressor, a fan powered by a power turbine driven by gas generated in the core engine, and a plurality of IGVs spaced circumferentially about an inlet to the compressor. At least one of the IGVs includes a heating fluid inlet port and a first plurality of film heating apertures and a second plurality of film heating apertures extending through a sidewall of the at least one IGV. At least one of the IGVs includes a first internal passage extending between the heating fluid inlet port and the first plurality of film heating apertures, the first internal passage includes an impingement leg configured to channel a first flow of heating fluid to a leading edge of the IGV, the first internal passage further includes a film heating leg configured to channel a flow of heating fluid from the leading edge of the IGV to the first plurality of film heating apertures. The at least one IGV further includes a second internal passage extending between the heating fluid inlet port and the second plurality of film heating apertures through a tortuous path configured to channel a second flow of heating fluid heat along an inner surface of the IGV before being channeled to second plurality of film heating apertures. The turbofan engine includes an IGV heating system header configured to receive the flow of heating fluid and distribute the flow of heating fluid to the at least one IGV and a source of IGV heating fluid.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the IGV heating systems described herein provide a cost-effective method for providing anti-icing heat to a plurality of IGV spaced about the inlet to the high pressure compressor or booster compressor of a gas turbine engine. The system heats the IGVs using HPC aft stage air internally in the vanes through internal passages to impinge on the leading edge (LE) and use the same air for film heating. This design employs internal passages within the IGV in combination with film heating holes to heat the IGV completely. Maintaining an IGV temperature greater than 50° F. will reduce the probability of ice accretion at the LE and pressure face of the IGVs. Although described herein with respect to inlet guide vanes, embodiments of the present disclosure are also applicable to stator vanes, outlet guide vanes, frame struts of HP (high pressure), IP (intermediate pressure), and LP (low pressure) compressors that are either stationary or variable-pitched.

Figure 1:
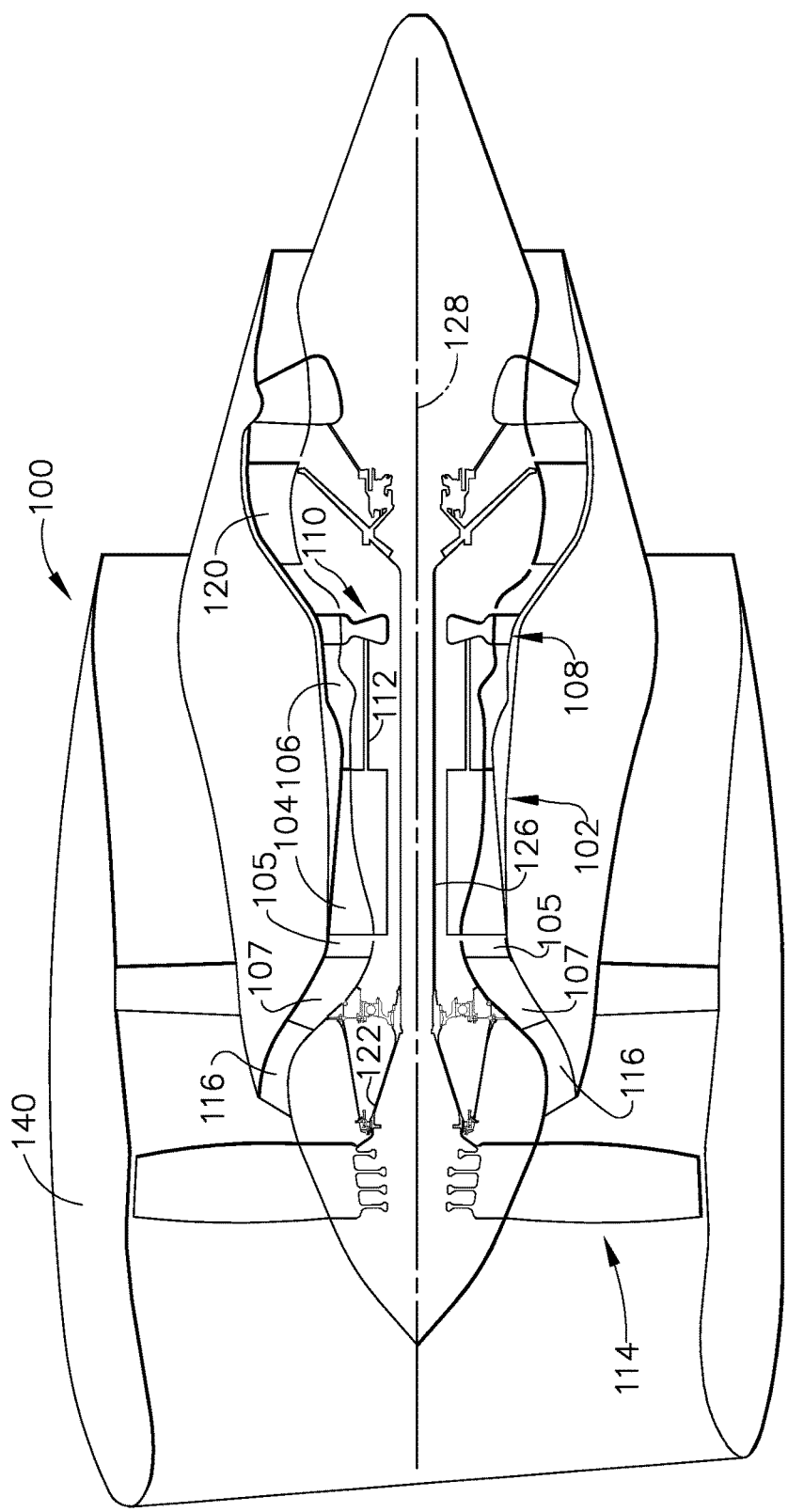
FIG. 1 is a schematic illustration of an exemplary gas turbine engine in accordance with an example embodiment of the present disclosure.

FIG. 1 is a schematic illustration of an exemplary gas turbine engine 100. Gas turbine engine 100 includes a gas generator or core engine 102 that includes a high pressure compressor (HPC) 104 that includes a plurality of inlet guide vanes 105, a combustor assembly 106, and a high pressure turbine (HPT) 108 in an axial serial flow relationship on a core engine rotor 110 rotating about a core engine shaft 112. Gas turbine engine 100 also includes a low pressure compressor or fan 114, a booster compressor 116 and a low pressure turbine 120 arranged in an axial flow relationship on a power engine rotor 122 rotating about a power engine shaft 126.

During operation, air flows along a central axis 128, and compressed air is supplied to HPC 104 through a compressor inlet 107. The highly compressed air is delivered to combustor assembly 106. Exhaust gas flow (not shown in FIG. 1) from combustor assembly 106 drives turbines 108 and 120, and turbine 120 drives fan or low pressure compressor 114 by way of shaft 126. Gas turbine engine 100 also includes a fan or low pressure compressor containment case 140. Moreover, air flowing into compressor inlet 107 may promote icing conditions on IGV 105. For example, because of a moisture content, pressure, and temperature of the incoming air, ice crystals may form and accumulate on surfaces of IGVs 105. The ice may build to a level sufficient to limit flow through inlet 107. Additionally, the ice may, during some operations tend to fall off of IGVs 105. In such a case, damage to IGVs 105 could occur. Providing heating to the internals of IGVs 105 prevents ice forming on IGVs 105 at all, thereby reducing a possibility of a damaging impact to IGVs 105.

Figure 2:
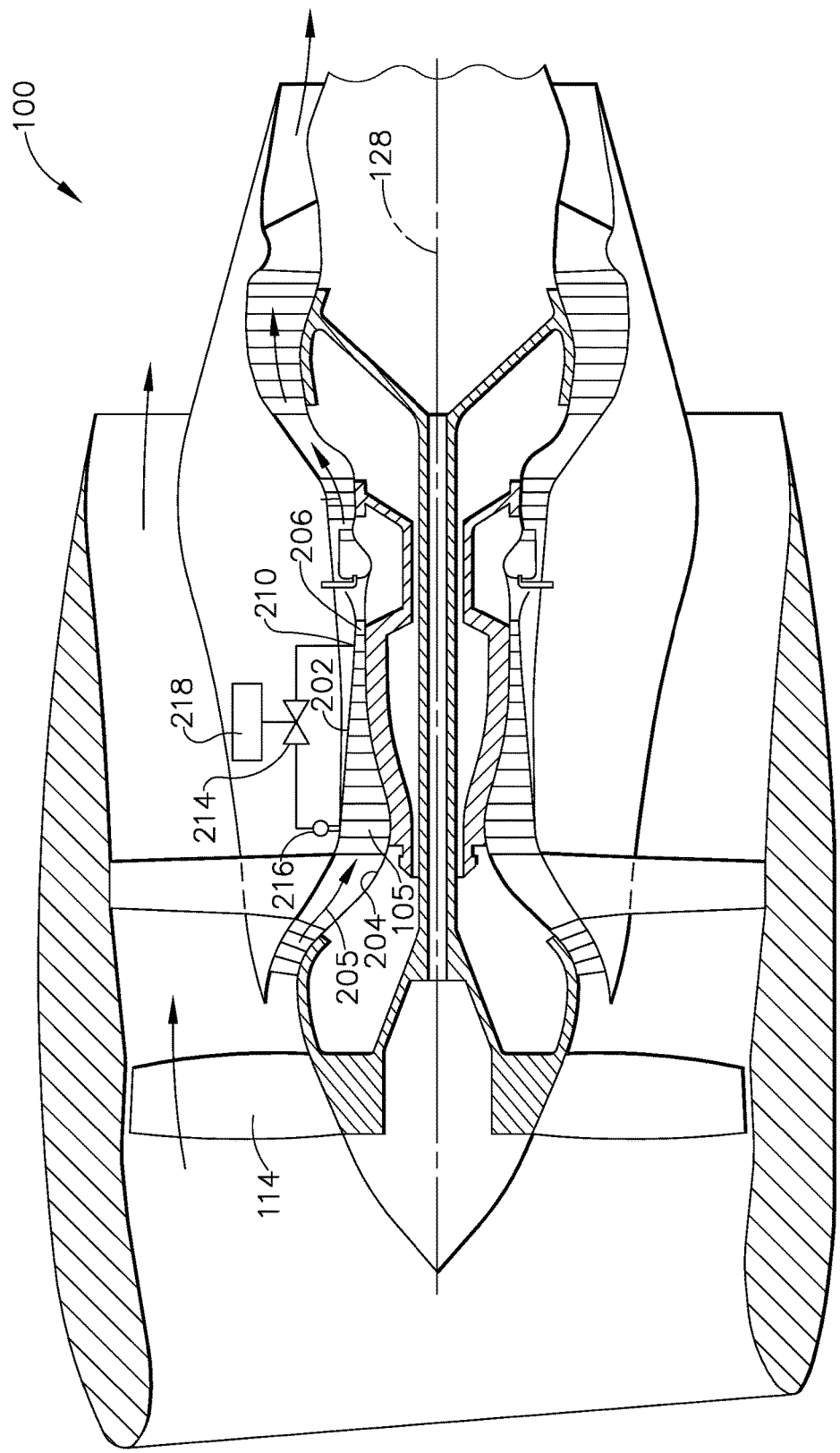
FIG. 2 is a schematic illustration of an IGV heating system that may be used with the gas turbine engine shown in FIG. 1.

FIG. 2 is a schematic illustration of an IGV heating system 200 that may be used with gas turbine engine 100. Specifically, in this embodiment, IGV heating system 200 facilitates preventing ice accretion and/or mitigates ice formation, along or within HPC 104. More specifically, HPC 104 includes a plurality of circumferentially-spaced inlet guide vanes (IGV) 105. IGV assemblies 105 extend between an outer structural casing 202 and a center hub 204, and channel airflow 205 entering engine 100 downstream through HPC 104. In one embodiment, HPC 104 includes a plurality of struts (not shown in FIG. 2) which extend between outer structural casing 202 and center hub 204. In the exemplary embodiment, HPC 104 also includes a plurality of outlet guide vane (OGV) assemblies 206 which extend between outer structural casing 202 and center hub 204.

In the exemplary embodiment, IGV heating system 200 includes a bleed port 210 configured to bleed air from a relatively high pressure stage of HPC 104. Air from bleed port 210 is a relatively high pressure and relatively high temperature due to the work performed on the air during the compression process. A bleed air conduit 212 is configured to channel bleed air from bleed air port 210 through a control valve 214 to a header 216 at least partially circumscribing IGVs 105. A controller 218 is communicatively coupled to control valve 214 to control a position of control valve 214.

Figure 3:
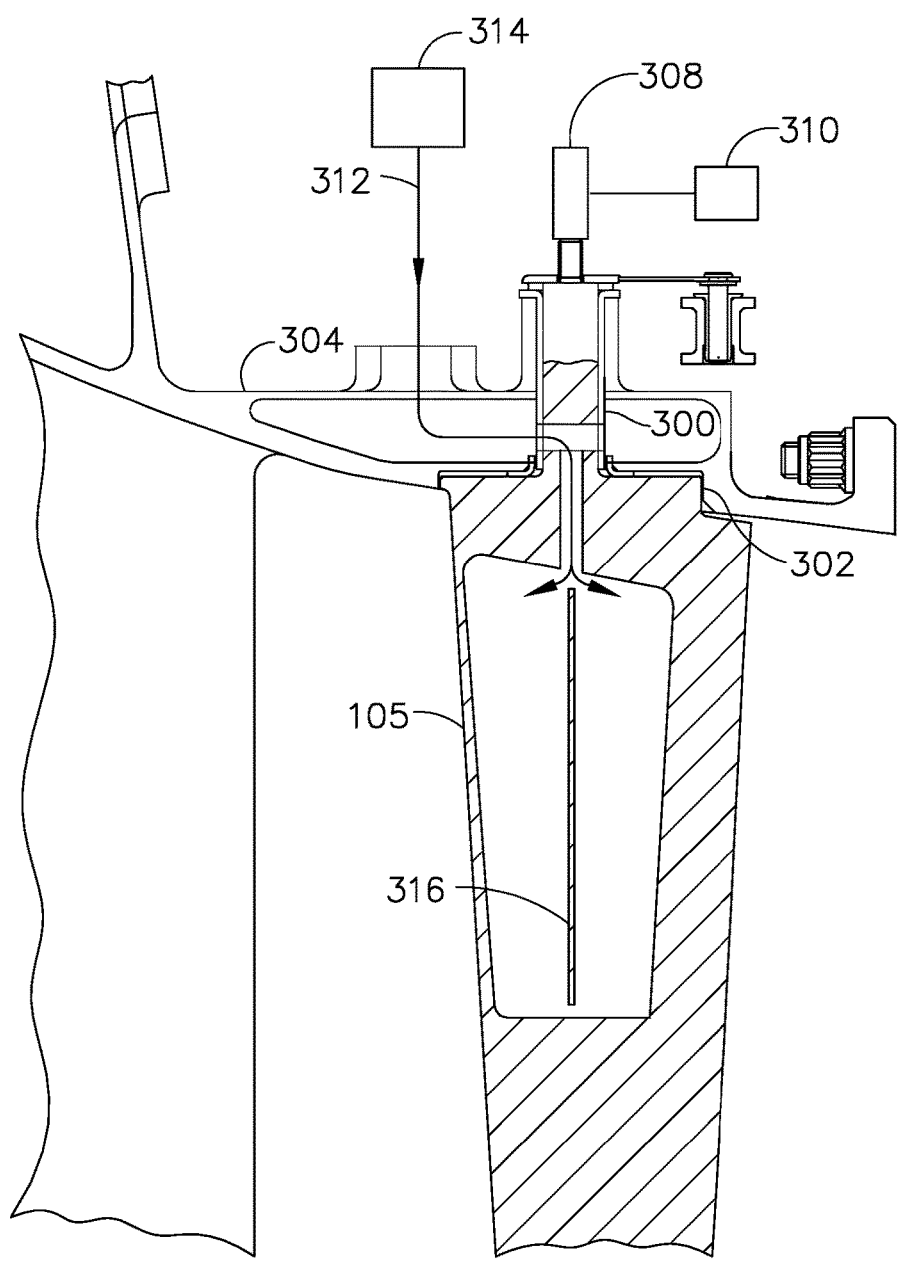
FIG. 3 is an enlarged illustration of a portion of the IGV heating system and taken along area 3 (shown in FIG. 2).

FIG. 3 is an enlarged illustration of a portion of IGV heating system 200 and taken along area 3 (shown in FIG. 2). In the example embodiment, IGV 105 is supported radially by a tailpiece 300 extending from a root 302 of IGV 105 to, for example, a fan hub frame (FHF) 304. In various embodiments, IGV includes a variable pitch actuated by a pitch change mechanism (PCM) 308 controlled by a pitch change controller 310. IGV 105 receives a flow 312 of relatively hot heating fluid from one of a plurality of heating fluid sources 314, which in some embodiments, is a higher stage of HPC 104. FIG. 3 is an illustration for an HPC IGV, which includes a variable pitch vane. IGV heating system 200 can be extended to other booster vanes and fan frame struts which are fixed and will not include tailpiece 300, PCM 308, and controller 310, but will still have system header 216 to receive flow which will lead the flow to inlet port 402.

Figure 4:
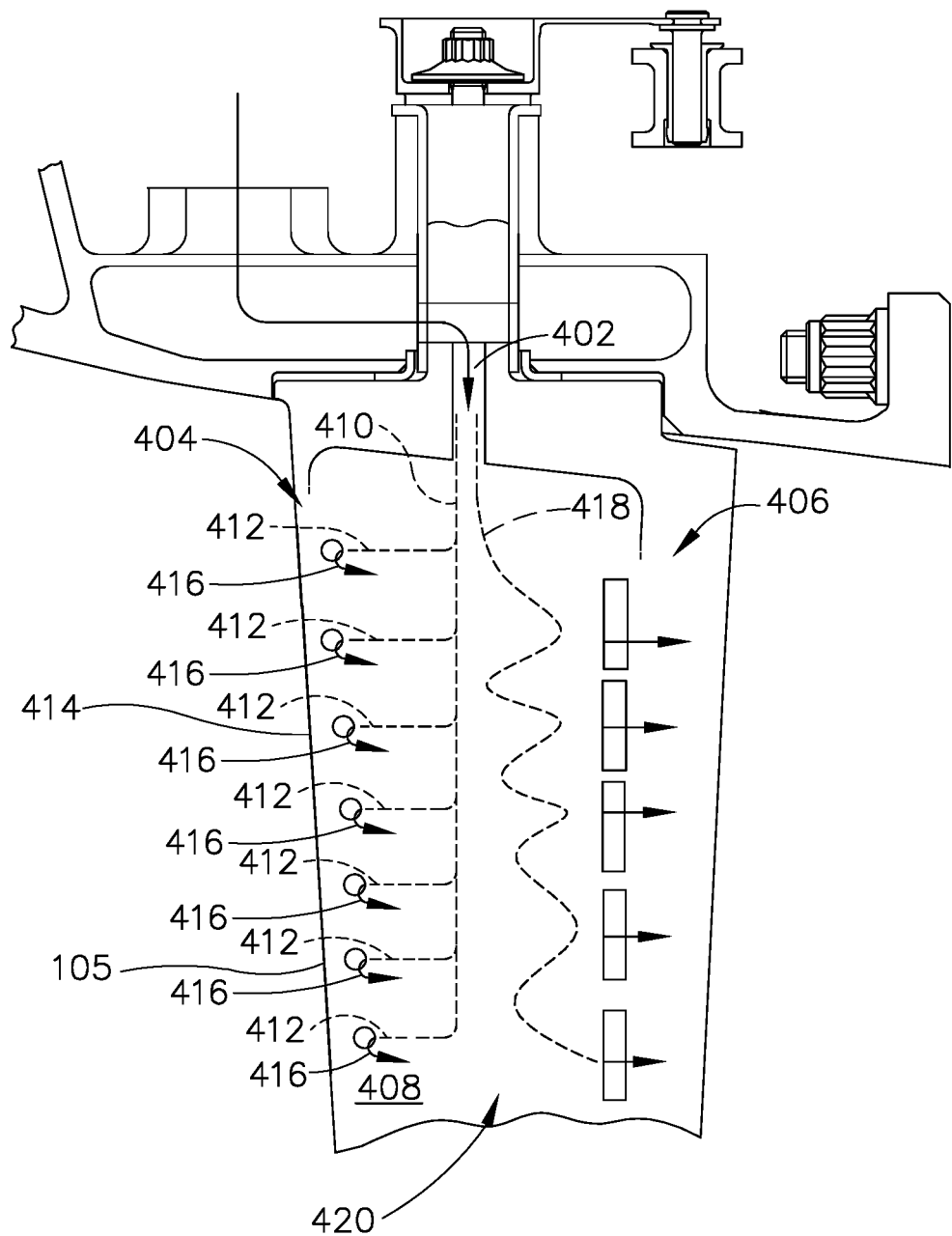
FIG. 4 is a side elevation view of an inlet guide vane such as the IGV shown in FIG. 1.

FIG. 4 is a side elevation view of an inlet guide vane 400 such as IGV 105 shown in FIG. 1. In various embodiments, a plurality of IGVs 400 are spaced circumferentially about inlet 107 to HPC 104. At least one of the IGVs 400 includes a heating fluid inlet port 402. IGV 400 also includes a first plurality of film heating apertures 404 and a second plurality of film heating apertures 406 extending through a sidewall 408 of IGV 400. A first internal passage 410 extends between heating fluid inlet port 402 and first plurality of film heating apertures 404. First internal passage 410 includes an impingement leg 412 configured to channel a first flow of heating fluid to a leading edge 414 of IGV 400. First internal passage 410 further includes a film heating leg 416 configured to channel a flow of heating fluid from leading edge 414 to first plurality of film heating apertures 404.

A second internal passage 418 extends between heating fluid inlet port 402 and second plurality of film heating apertures 406 through a tortuous path 420 configured to channel a second flow of heating fluid heat along an inner surface of IGV 400 before being channeled to second plurality of film heating apertures 406.

Figure 5:
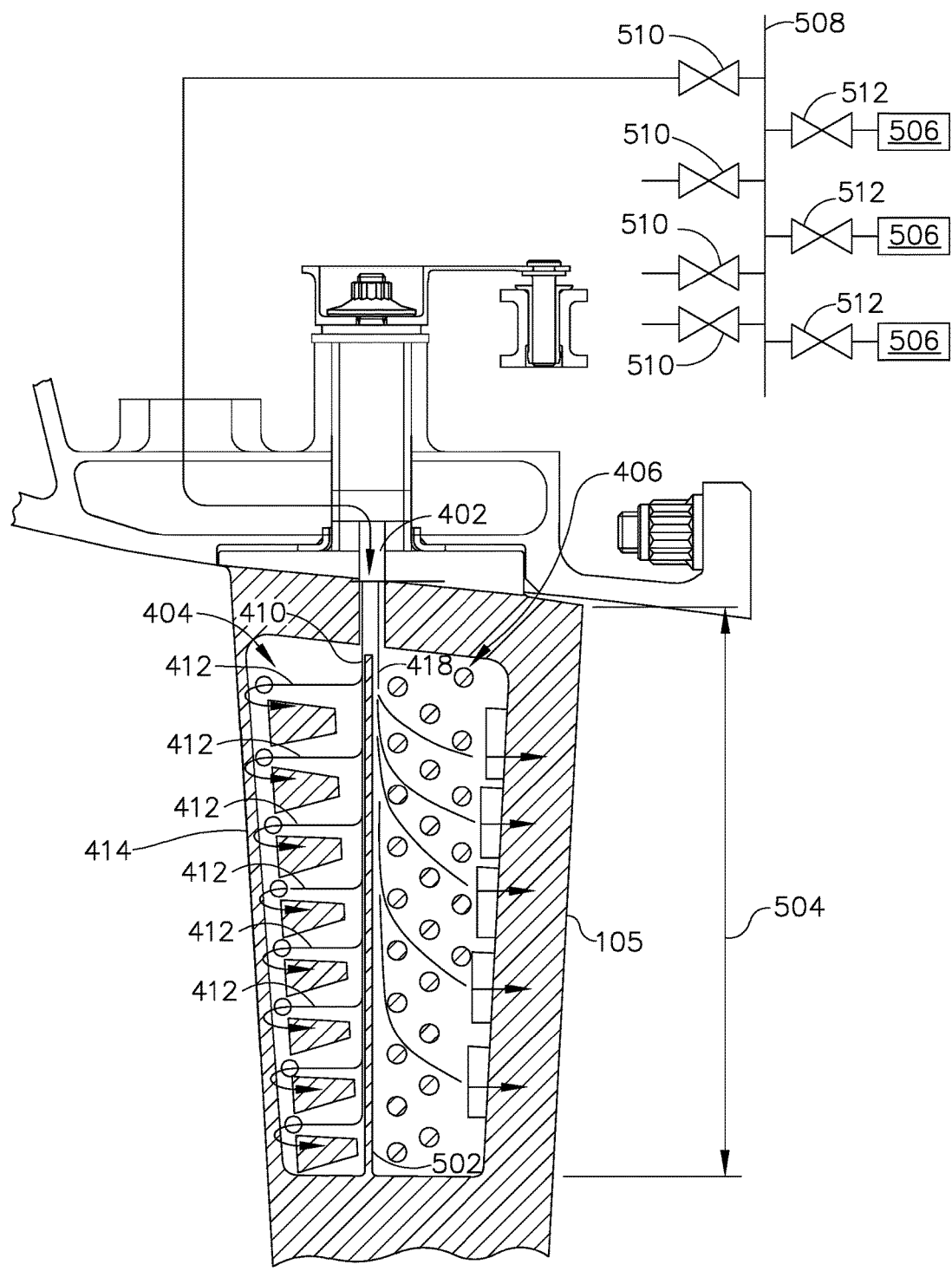
FIG. 5 is a side elevation view of an inlet guide vane such as the IGV shown in FIG. 1.

FIG. 5 is a side elevation view of an inlet guide vane 500 such as IGV 105 shown in FIG. 1. In the example embodiment, heating fluid inlet port 402 is divided into two separate internal passages 410 and 418 by a central wall 502 extending from an inner surface of the sidewalls of IGV 500. In the example embodiment, heating is limited to a radially outer portion 504 of IGV 500. A source 506 of IGV heating fluid is coupled in flow communication with an IGV heating system header 508 configured to receive a flow of heating fluid and to distribute the flow of heating fluid to IGV 500 through individual IGV control valves 510 or through a source selector control valves 512 coupled in flow communication between each of sources 506 and IGV heating system header 508. Each of the flow through internal passages 410 and 418 are distributed into the cavity radially from hub to tip. For illustration two different methods are shown. The flow through internal passage 410 is distributed into smaller flows of impingement leg 412 by passages made in the cavity. The flow through flow path 418 is distributed by scattered cylindrical blockages which breaks the flow into smaller streams. These methods are interchangeable and alternate methods can be easily devised to distribute the flow radially into the cavities. Additionally flow through impingement leg 412 is impinged upon the IGV LE with a radial nozzle section as illustrated. The impingement can also be achieved alternately by having a nozzle section across the thickness of the IGV.

Figure 6:
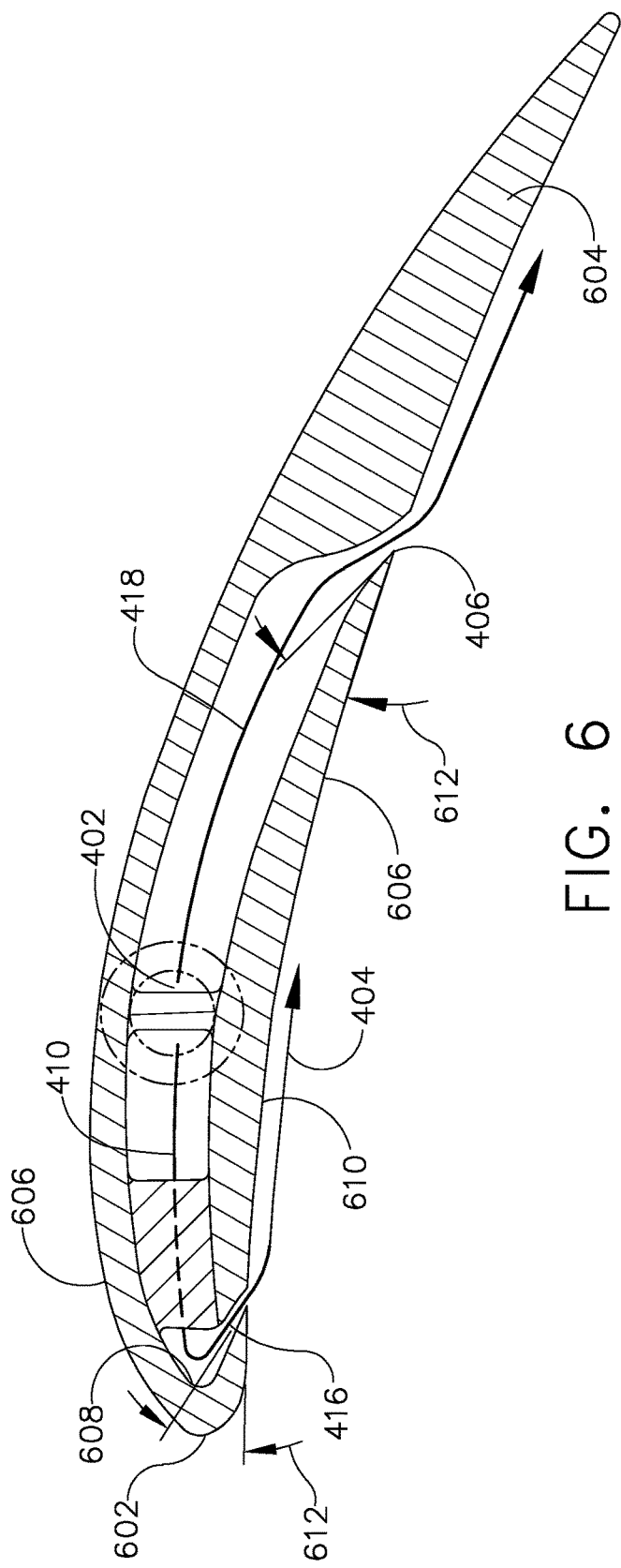
FIG. 6 is a plan view of an inlet guide vane such as the IGV shown in FIG. 1.

FIG. 6 is a plan view of an inlet guide vane 600 such as IGV 105 shown in FIG. 1. In the example embodiment, IGV 600 includes a leading edge 602, a trailing edge 604, and two opposing sidewalls 606 extending therebetween. IGV 600 includes first internal passage 410 extending forward from heating fluid inlet port 402, which is positioned approximately midway between leading edge 602 and trailing edge 604. IGV 600 also includes second internal passage 418 extending aftward from heating fluid inlet port 402. A flow of heating air flowing through first internal passage 410 is channeled forward to directly impinge on an inner surface 608 opposite leading edge 602. The flow of heating air is then directed aftward toward a pressure surface 610 of sidewall 606. The flow of heating air flowing through first internal passage 410 then exits IGV 600 through first plurality of film heating apertures 404. A flow of heating air flowing through second internal passage 418 is channeled radially inwardly through a tortuous path to increase an ability of the flow air flowing through second internal passage 418 to heat pressure surface 610 towards trailing edge 604. The flow of heating air flowing through second internal passage 418 then exits IGV 600 through second plurality of film heating apertures 406. In the example embodiment, first and second pluralities of film heating apertures 404 and 406 are angled aft at an acute angle 612 with respect to surface 610 of IGV 600 to maintain a laminar flow across surface 610.

Figure 7A:
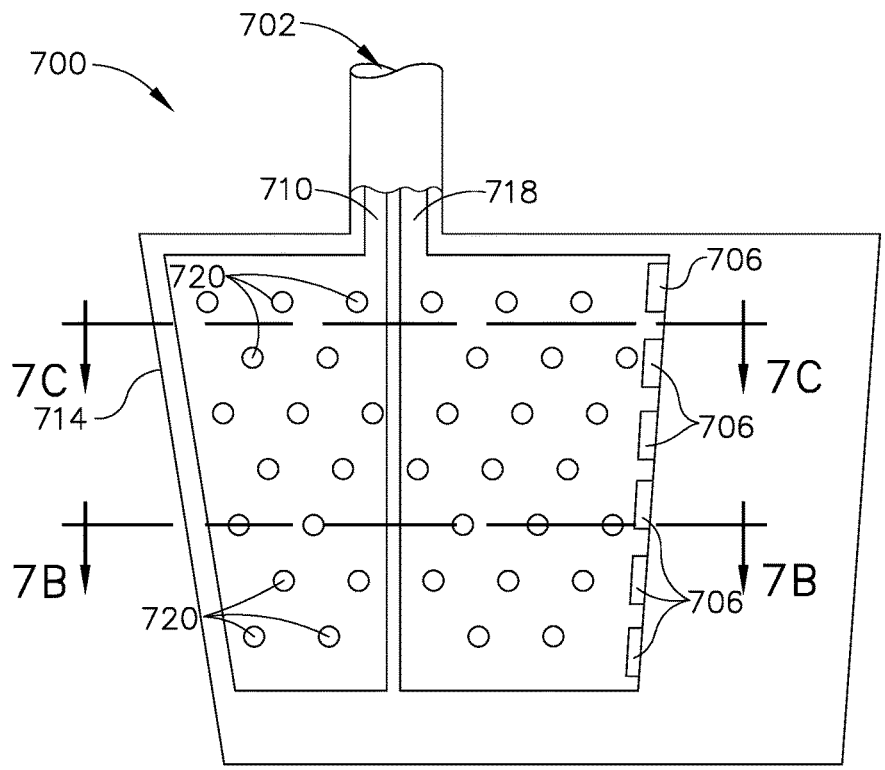
FIG. 7A is a side elevation view of an inlet guide vane (IGV) such as the IGV shown in FIG. 1.
Figure 7B:
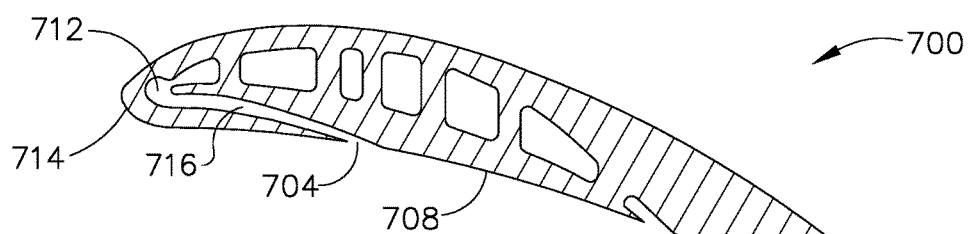
FIG. 7B is a cross-sectional view of IGV taken across line B-B shown in FIG. 7A.
Figure 7C:
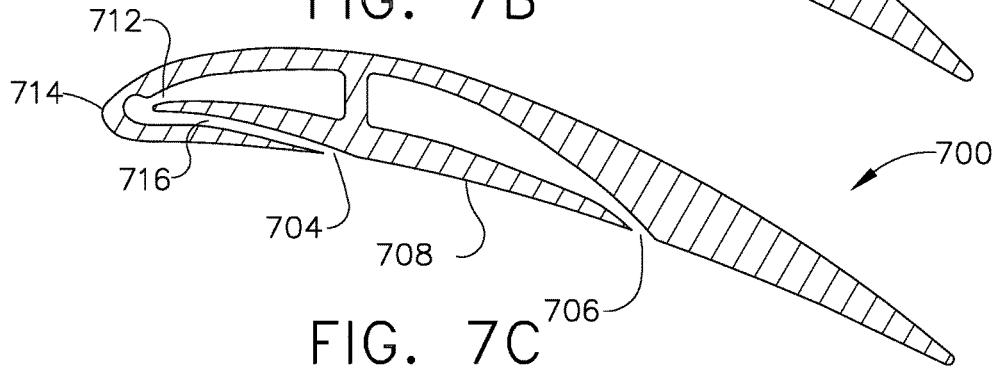
FIG. 7C is a cross-sectional view of IGV taken across line C-C (shown in FIG. 7A).

FIG. 7A is a side elevation view of an inlet guide vane (IGV) 700 such as IGV 105 shown in FIG. 1. FIG. 7B is a cross-sectional view of IGV 700 taken across line B-B (shown in FIG. 7A). FIG. 7C is a cross-sectional view of IGV 700 taken across line C-C (shown in FIG. 7A). In the example embodiment, IGV 700 includes a heating fluid inlet port 702. IGV 700 also includes a first plurality of film heating apertures 704 and a second plurality of film heating apertures 706 extending through a sidewall 708 of IGV 700. A first internal passage 710 extends between heating fluid inlet port 702 and first plurality of film heating apertures 704. First internal passage 710 may be formed of a tortuous path formed by a plurality of flow blockages 720 positioned to provide a predetermined flow pattern within IGV 700. First internal passage 710 may also be formed of channels that direct heating flow from inlet port 702 through IGV 700. In one embodiment, first internal passage 710 includes an impingement leg 712 configured to channel a first flow of heating fluid to a leading edge 714 of IGV 700. First internal passage 710 further includes a film heating leg 716 configured to channel a flow of heating fluid from leading edge 714 to first plurality of film heating apertures 704.

A second internal passage 718 extends between heating fluid inlet port 702 and second plurality of film heating apertures 706. Second internal passage 718 may be formed of a tortuous path formed by a plurality of flow blockages 722 positioned to provide a predetermined flow pattern within IGV 700. Second internal passage 718 may also be formed of channels that direct heating flow from inlet port 702 through IGV 700. In one embodiment, second internal passage 718 includes an impingement leg configured to channel the second flow of heating fluid along an inner surface of sidewall 708 before being channeled to second plurality of film heating apertures 706.

FIG. 5 illustrates one method of generating an impingement jet for the first internal passage 710 by nozzle sections placed radially apart at the LE. FIG. 7 illustrates an alternate method of generating the impingement jet by a nozzle section through the thickness of the vane. Either layout or a combination of both can be used for LE impingement.

The above-described embodiments of a heating system for maintaining hollow structures in an annular flow path ice free provides an efficient method of heating for example, HP, IP or LP compressor IGVs, stator vanes, OGVs, and/or frame struts using a header manifold for collecting hot fluid from higher compressor stages and channeling a flow of the collected hot fluid into the respective vane or strut and distributing the flow radially in the vane or strut. The heating system also provides and efficient method of impingement heating of the leading edge (LE) of the vane or strut and/or film heating of the vane or strut surface with one or multiple legs for film heating. Specifically, the above-described heating system includes a plurality of sources of heated fluid, such as, but not limited to, a compressor bleed connection to provide a continuous flow of heated fluid to the internals of the vane or struts. In addition, the flow of heated fluid is channeled to exit the vane or strut an angle that promotes laminar or film flow along the exterior surface of the vane or strut further providing a heating benefit and a flow benefit for reducing ice formation on the exterior surface.

Exemplary embodiments of IGV heating systems are described above in detail. The IGV heating systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring a transfer of fluid flow from a static component to a rotating component, and are not limited to practice with only the systems and methods as described herein. Rather, the exemplary embodiment can be implemented and utilized in connection with many other machinery applications that are currently configured to receive and accept modulated heating systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heating system for components in an air stream, said heating system comprising:
    a plurality of hollow structures spaced circumferentially about an annular flow path, at least one of the plurality of hollow structures comprising:
    a heating fluid inlet port;
    a first plurality of film heating apertures and a second plurality of film heating apertures extending through a sidewall of at least one of said plurality of hollow structures;
    a first internal passage extending between said heating fluid inlet port and said first plurality of film heating apertures, said first internal passage configured to channel a first flow of heating fluid to a leading edge of said at least one of said plurality of hollow structures, wherein said first internal passage further comprises a film heating leg configured to channel a flow of heating fluid from the leading edge of said at least one of the plurality of hollow structures to said first plurality of film heating apertures; and
    a second internal passage extending between said heating fluid inlet port and said second plurality of film heating apertures configured to channel a second flow of heating fluid heat along an inner surface of said at least one of said plurality of hollow structures before being channeled to said second plurality of film heating apertures;
    a heating system header configured to receive the flow of heating fluid and distribute the flow of heating fluid to said at least one of said plurality of hollow structures; and
    a source of heating fluid.

2. The system of claim 1, wherein said annular flow path comprises at least one of a gas turbine engine inlet, a high pressure compressor inlet, a booster compressor inlet, an intermediate pressure compressor inlet, and a low pressure compressor inlet.

3. The system of claim 1, wherein said at least one of said plurality of hollow structures comprises at least one of a vane and a strut.

4. The system of claim 1, wherein said first internal passage comprises at least one of an impingement leg and a tortuous path configured to channel the first flow of heating fluid to a leading edge of said at least one of said plurality of hollow structures.

5. The system of claim 1, wherein said second internal passage comprises at least one of an impingement leg and a tortuous path configured to channel the second flow of heating fluid heat along an inner surface of said at least one of said plurality of hollow structures before being channeled to the second plurality of film heating apertures.

6. The system of claim 1, wherein said source of heating fluid comprises a bleed port of an engine compressor.

7. The system of claim 1, wherein the source of heating fluid includes a plurality of sources of heating fluid coupled in flow communication with said header using a respective control valve.

8. The system of claim 1, wherein said first and second plurality of film heating apertures are angled aft at an acute angle with respect to a surface of said hollow structure to maintain a laminar flow across the surface of said at least one of the plurality of hollow structures.

9. The system of claim 1, wherein said plurality of hollow structures are rotatable about a respective pitch axis using a variable pitch change mechanism.

10. A method of heating an airfoil member, said method comprising:
    channeling a first flow of relatively hot fluid from one or more sources of the relatively hot fluid to a first internal passage of the airfoil member, the first internal passage extending between a heating fluid inlet port of the airfoil member and a first plurality of film heating apertures extending through a sidewall of the airfoil member, wherein channeling the first flow of relatively hot fluid comprises channeling the first flow of relatively hot fluid through a film heating leg from a leading edge of the airfoil member to the first plurality of film heating apertures; and
    channeling a second separate flow of relatively hot fluid from one or more sources of the relatively hot fluid to a second internal passage of the airfoil member, the second internal passage extending between the heating fluid inlet port of the airfoil member and a second plurality of film heating apertures extending through the sidewall of the airfoil member, the second internal passage including a tortuous path configured to channel the second flow of relatively hot fluid along an inner surface of the airfoil member before being channeled to the second plurality of film heating apertures.

11. The method of claim 10, wherein channeling the first and second flow of relatively hot fluid from one or more sources comprises channeling the first and second flow of relatively hot fluid from one or more sources to a header through a respective selectable control valve.

12. The method of claim 10, wherein channeling the first and second flow of relatively hot fluid from one or more sources comprises channeling the first and second flow of relatively hot fluid from a bleed port of an engine compressor.

13. The method of claim 10, wherein channeling the first flow of relatively hot fluid comprises channeling the first flow of relatively hot fluid through an impingement leg configured to channel the first flow of relatively hot fluid to a leading edge of the airfoil member.

14. The method of claim 10, wherein channeling the second flow of relatively hot fluid comprises channeling the second flow of relatively hot fluid through a tortuous second internal passage along an inner surface of the airfoil member to the second plurality of film heating apertures.

15. The method of claim 10, further comprising forming said first and second plurality of film heating apertures angled aft at an acute angle with respect to a surface of the airfoil member to maintain a laminar flow across a surface of the airfoil member the flow laminar film.

16. A turbofan engine comprising:
a core engine including a multistage compressor;
a fan powered by a power turbine driven by gas generated in said core engine;
a plurality of inlet guide vanes (IGV) spaced circumferentially about an inlet to said compressor, at least one IGV of the plurality of inlet guide vanes comprising:
a heating fluid inlet port;
a first plurality of film heating apertures and a second plurality of film heating apertures extending through a sidewall of said at least one IGV;
a first internal passage extending between said heating fluid inlet port and said first plurality of film heating apertures, said first internal passage comprising an impingement leg configured to channel a first flow of heating fluid to a leading edge of said at least one IGV, said first internal passage further comprising a film heating leg configured to channel a flow of heating fluid from the leading edge of said at least one IGV to said first plurality of film heating apertures; and
a second internal passage extending between said heating fluid inlet port and said second plurality of film heating apertures through a tortuous path configured to channel a second flow of heating fluid heat along an inner surface of said at least one IGV before being channeled to said second plurality of film heating apertures;
an IGV heating system header configured to receive the flow of heating fluid and distribute the flow of heating fluid to the at least one IGV; and
a source of IGV heating fluid.

17. The engine of claim 16, wherein said compressor comprises at least one of a high pressure compressor (HPC) and a booster compressor.

18. The engine of claim 16, wherein said source of IGV heating fluid comprises a bleed port of an engine compressor.

19. The engine of claim 16, further comprising a plurality of sources of IGV heating fluid coupled in flow communication with said header using a respective control valve.

20. The engine of claim 16, wherein apertures are angled aft at an acute angle to maintain a laminar flow across a surface of the at least one IGV.

21. The engine of claim 16, wherein said plurality of IGVs are rotatable about a respective pitch axis using a variable pitch change mechanism.

* * * * *